US009675230B2

(12) United States Patent
Dries et al.

(10) Patent No.: US 9,675,230 B2
(45) Date of Patent: Jun. 13, 2017

(54) DISHWASHER APPLIANCE AND A METHOD FOR FORMING A UNITARY TUB

(71) Applicant: General Electric Company, Schenectady, NY (US)

(72) Inventors: John Edward Dries, Louisville, KY (US); Gregory Owen Miller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/678,015

(22) Filed: Apr. 3, 2015

(65) Prior Publication Data

US 2016/0287049 A1    Oct. 6, 2016

(51) Int. Cl.
| | | |
|---|---|---|
| A47L 15/42 | (2006.01) | |
| A47L 15/14 | (2006.01) | |
| B33Y 80/00 | (2015.01) | |
| C02F 103/00 | (2006.01) | |
| B33Y 10/00 | (2015.01) | |
| B33Y 50/00 | (2015.01) | |
| B29L 31/00 | (2006.01) | |
| C02F 1/00 | (2006.01) | |

(52) U.S. Cl.
CPC .......... *A47L 15/4202* (2013.01); *A47L 15/14* (2013.01); *B33Y 80/00* (2014.12); *B29L 2031/762* (2013.01); *B33Y 10/00* (2014.12); *B33Y 50/00* (2014.12); *C02F 1/001* (2013.01); *C02F 2103/002* (2013.01); *C02F 2307/12* (2013.01)

(58) Field of Classification Search
CPC ............. A47L 15/4204; A47L 15/4208; A47L 15/4225; A47L 15/4206; A47L 15/4202
USPC .... 134/111, 56 D, 10, 25.2, 186, 110, 104.4, 134/200, 58 D, 57 D, 108, 104.2, 109; 210/196, 167.01, 493.1, 411, 791, 493.3, 210/767, 805, 409, 493.5, 498, 499, 295
See application file for complete search history.

(56) References Cited

U.S. PATENT DOCUMENTS

| | | | | |
|---|---|---|---|---|
| 2,796,993 A | * | 6/1957 | Imershein | ............ B01D 25/215 210/231 |
| 4,566,970 A | * | 1/1986 | Piai | ......................... D06F 39/10 134/153 |
| 5,924,433 A | * | 7/1999 | Thies | ................... A47L 15/4246 134/179 |
| 6,375,699 B1 | * | 4/2002 | Beck | ................. B29C 45/14418 264/257 |
| 8,286,236 B2 | | 10/2012 | Jung et al. | |
| 8,592,519 B2 | | 11/2013 | Martinoni | |
| 2014/0238447 A1 | * | 8/2014 | Hofmann | ............ A47L 15/4202 134/110 |

* cited by examiner

*Primary Examiner* — David Cormier
*Assistant Examiner* — Thomas Bucci
(74) *Attorney, Agent, or Firm* — Dority & Manning, P.A.

(57) ABSTRACT

A dishwasher appliance with a tub is provided. The tub defines a filter medium and a supply conduit within the tub. The supply conduit of the tub extends from the filter medium to a spray assembly such that the supply conduit of the tub directs filtered water from the filter medium to the spray assembly during operation of a pump. A related method for forming a unitary tub for a dishwasher appliance is also provided.

6 Claims, 5 Drawing Sheets

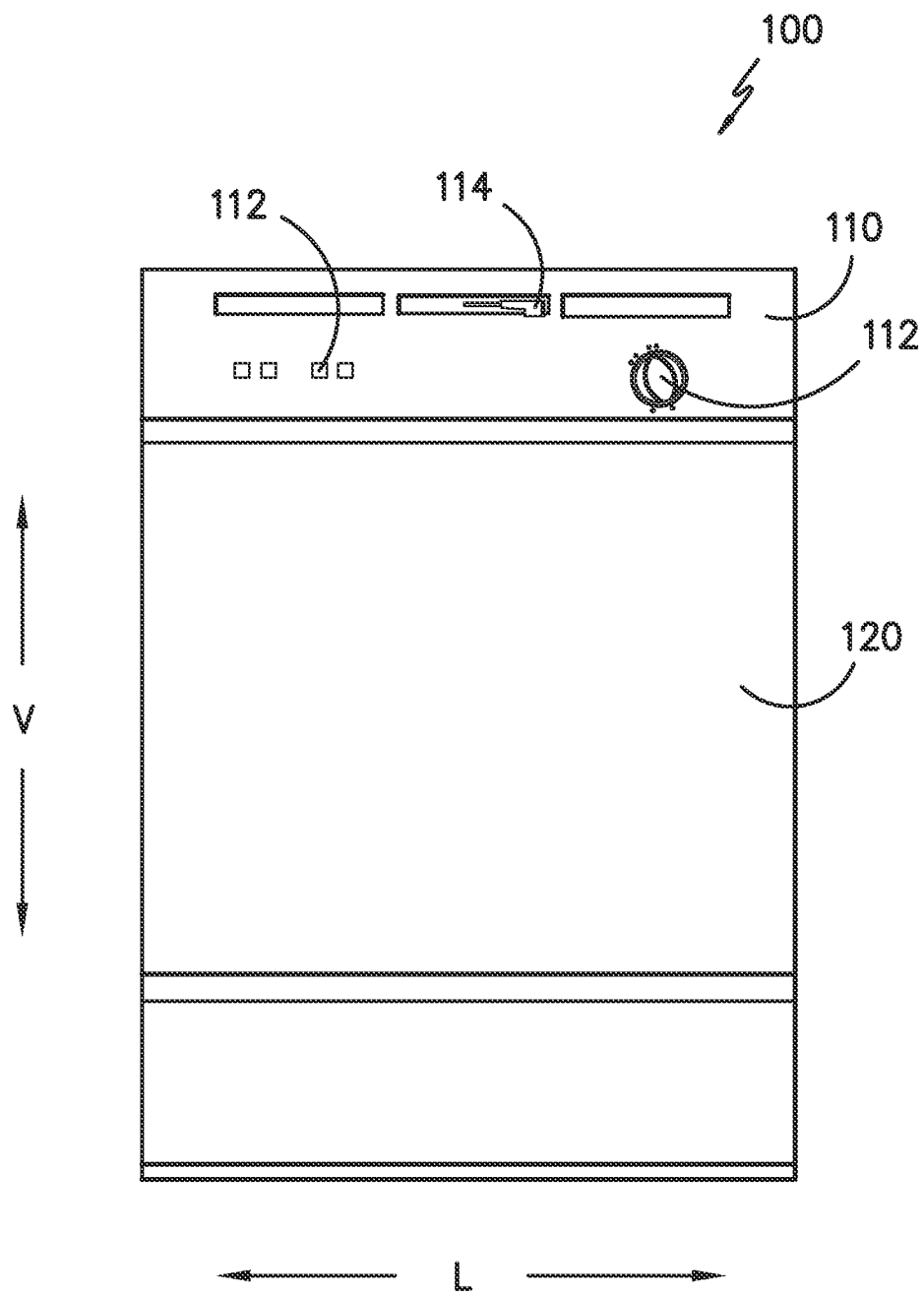
FIG. -1-

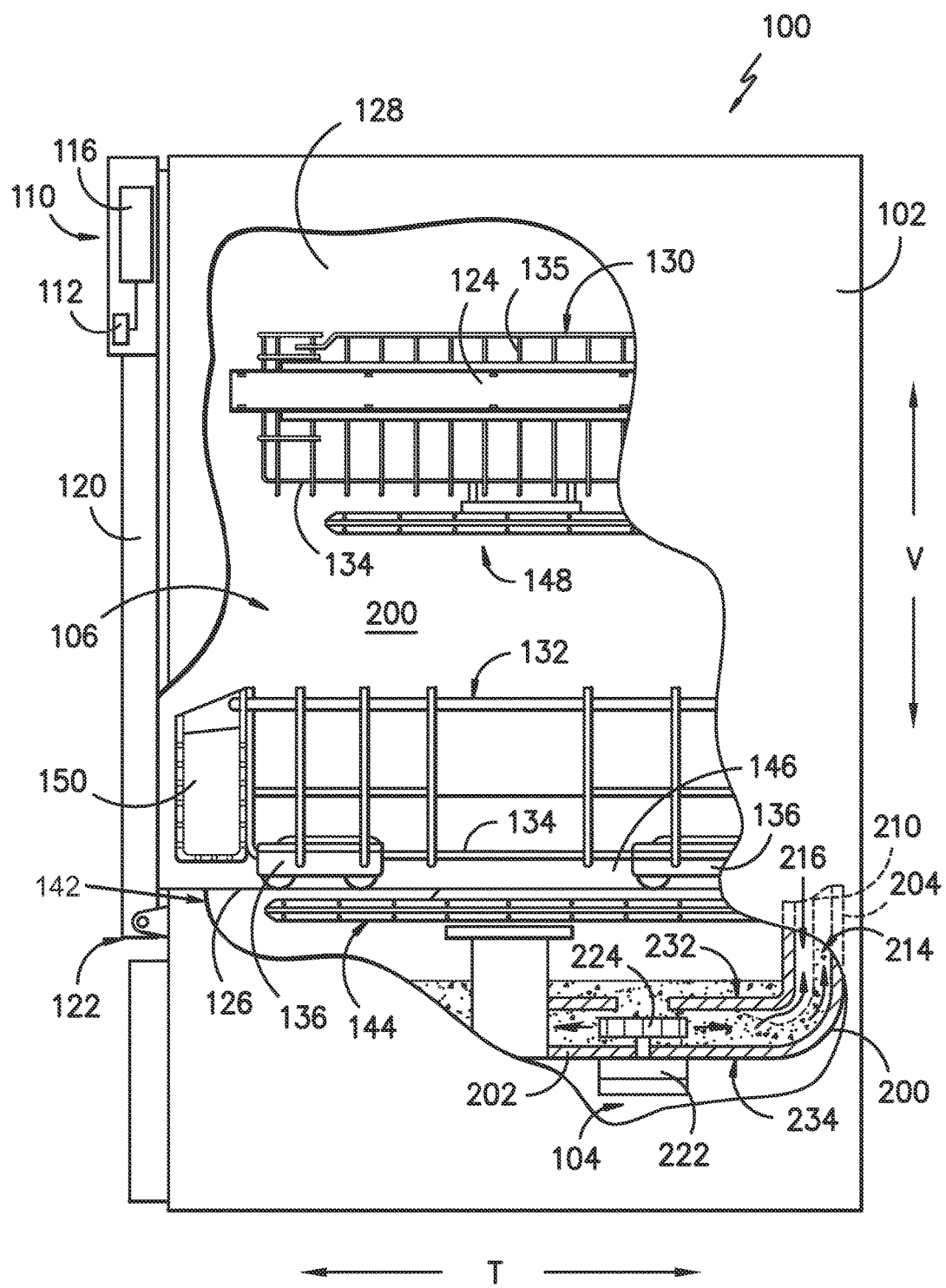
FIG. -2-

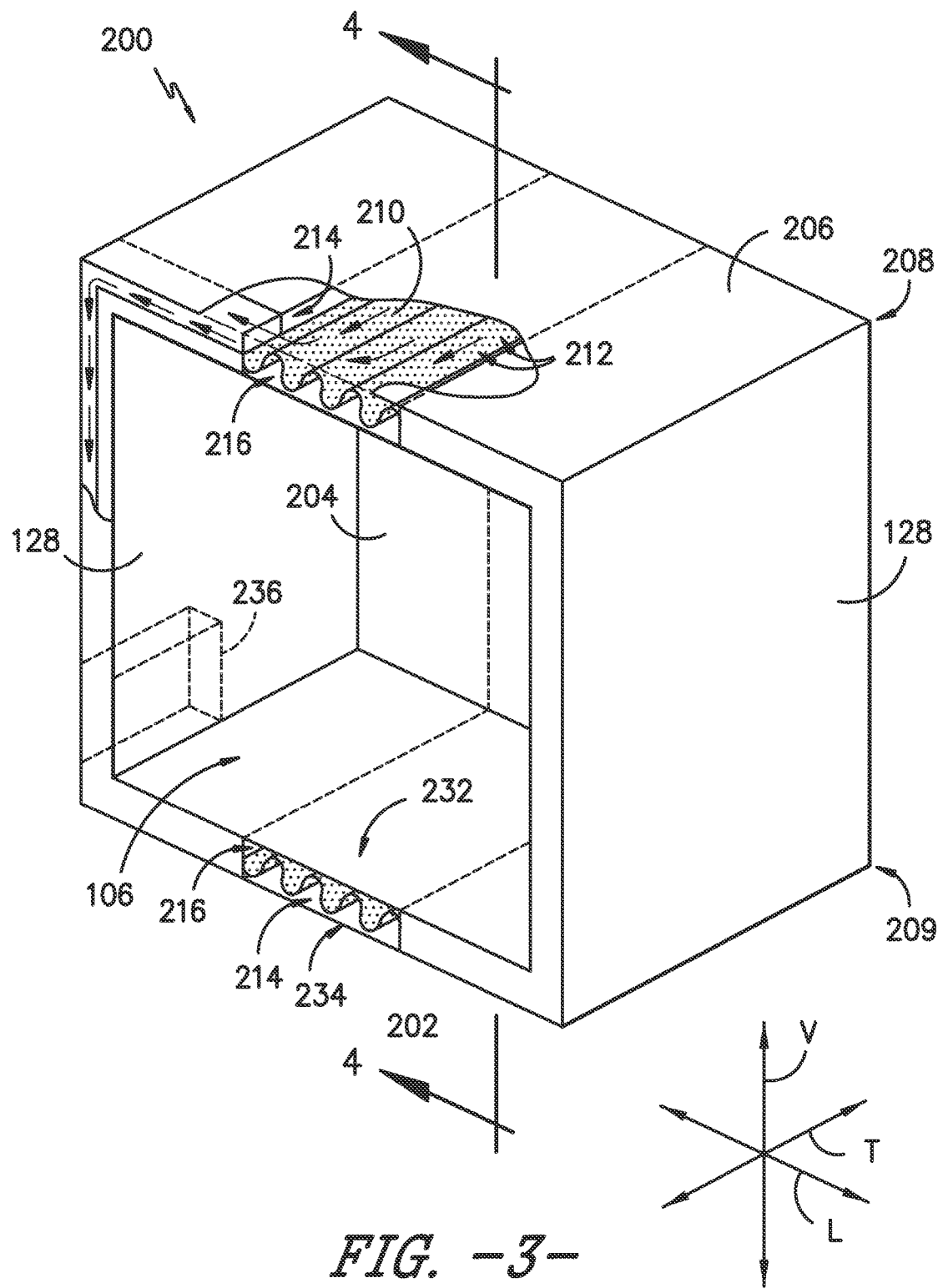
FIG. -3-

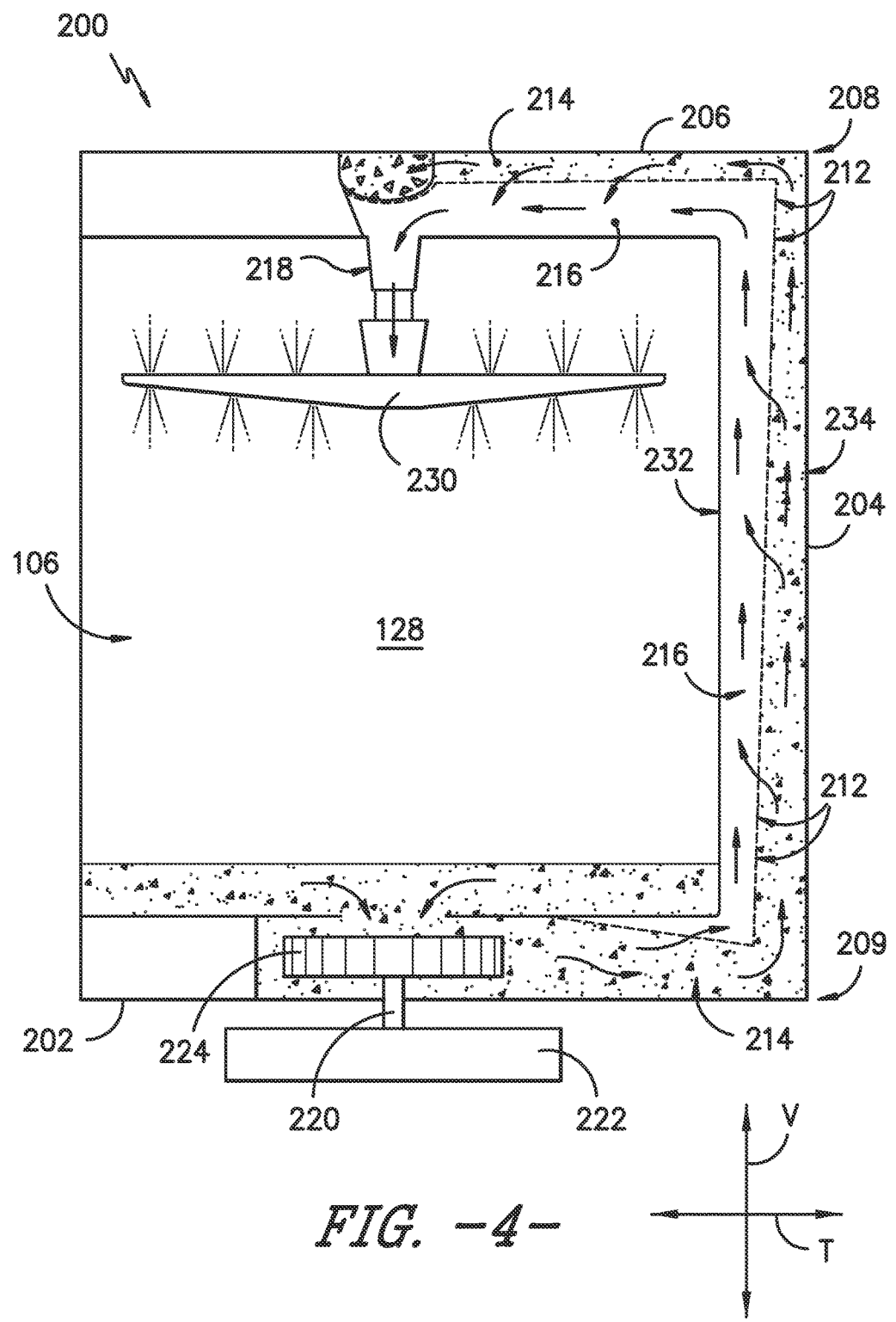
FIG. -4-

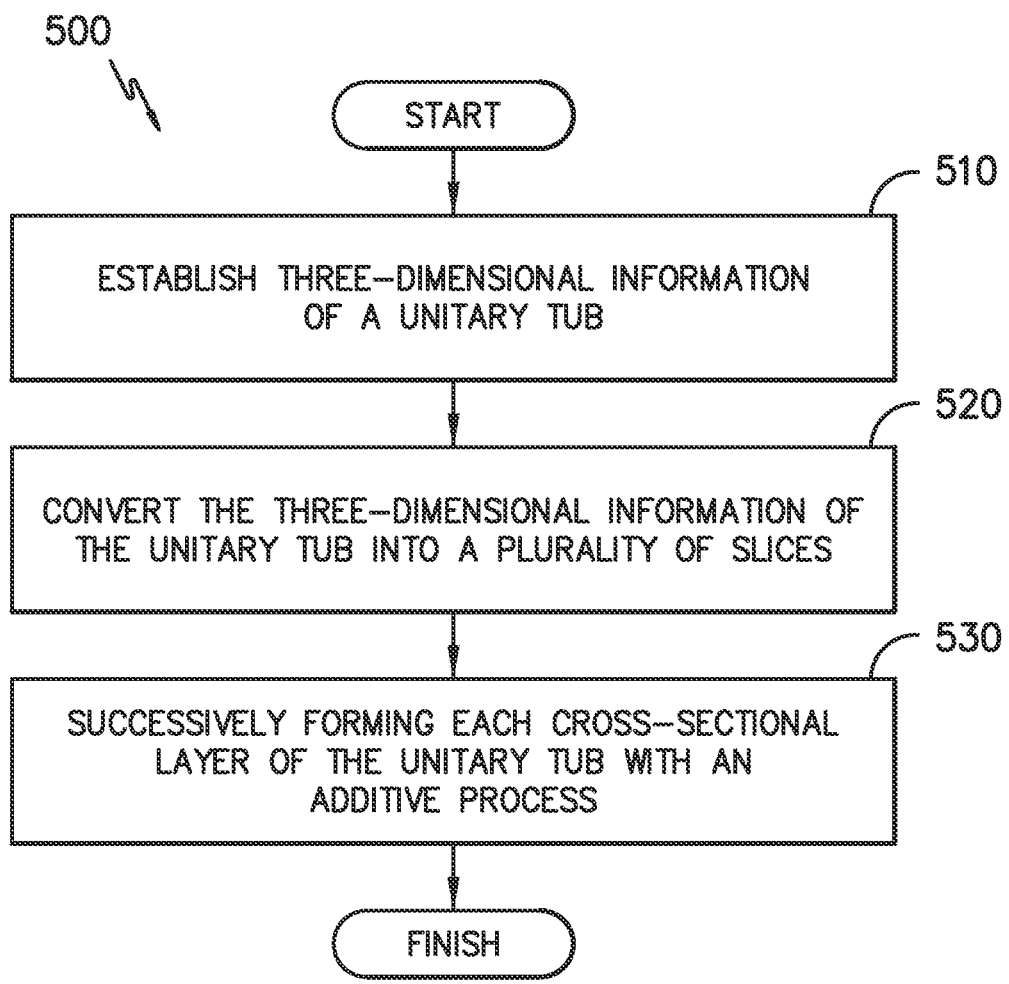
FIG. -5-

DISHWASHER APPLIANCE AND A METHOD FOR FORMING A UNITARY TUB

FIELD OF THE INVENTION

The present subject matter relates generally to dishwasher appliances and tubs for dishwasher appliances.

BACKGROUND OF THE INVENTION

During wash and rinse cycles, dishwashers typically circulate a fluid through a wash chamber over articles such as pots, pans, silverware, and other cooking utensils. The fluid can be e.g., various combinations of water and detergent during the wash cycle or water (which may include additives) during the rinse cycle. Typically the fluid is recirculated during a given cycle using a pump. Fluid is collected at or near the bottom of the wash chamber and pumped back into the chamber through e.g., nozzles in the spray arms and other openings that direct the fluid against the articles to be cleaned or rinsed.

Depending upon the level of soil upon the articles, fluids used during wash and rinse cycles will become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and materials are removed or reduced from the fluid.

For mechanical filtration, the selectivity of the filter to remove soil particles of different sizes is typically determined by providing fluid paths (such as pores or apertures) through a filter medium that are smaller than the particles for which filtration is desired. Particles having a dimension larger than the width of the fluid paths will be trapped or prevented from passing through the filter while particles smaller than the width of the fluid path will generally pass through. Some particle sizes and/or types may be not harmful to the pump or spray assemblies and, therefore, can be allowed to pass through the filter. However, leaving smaller particles in the wash or rinse fluid may not be acceptable as these particles may become deposited on the articles being washed/rinsed and thereby affect the user's perception of the cleanliness and/or appearance.

While larger particles can generally be readily removed from the fluid circulated through the wash chamber, challenges are presented in removing smaller particles—particularly as the particle size targeted for removal decreases. For example, if a dishwashing appliance is provided with a fine particle filter—such as one for removing particles 200 microns or larger—the filter can be prone to clogging particularly during the early stages of the cleaning process. During a pre-wash cycle or early stage of a wash cycle, a greater amount of larger food particles may be present on the articles placed in the wash chamber. A fine particle filter—such as one for removing particles 200 microns or larger—may become substantially clogged.

To unclog the filter, a conventional approach has been to drain the dirty fluid from the wash chamber to remove the particles clogging the filter. New—i.e. clean fluid—is then reintroduced for cycling again. Depending on the level of soil still present on the articles, yet another cycle of draining and refilling may have to be repeated. Unfortunately, this run, drain, and refill approach for unclogging a filter is inefficient as it requires the use of additional fluid (i.e. water). Of course, a filter media can be selected that only captures larger particles so that it clogs less, such as e.g., 0.030" or larger, but this comes at the expense of losing the ability to remove smaller particles from the fluid and an associated effect on the resulting cleanliness of the articles.

Accordingly, a dishwasher appliance having filtering system for the removal of particles from the wash fluid would be useful. More particularly, a dishwasher appliance having filtering system for the removal of particles from the wash fluid while that also includes features for limiting clogging of the filtering system would be useful.

BRIEF DESCRIPTION OF THE INVENTION

The present subject matter provides a dishwasher appliance with a tub. The tub defines a filter medium and a supply conduit within the tub. The supply conduit of the tub extends from the filter medium to a spray assembly such that the supply conduit of the tub directs filtered water from the filter medium to the spray assembly during operation of a pump. A related method for forming a unitary tub for a dishwasher appliance is also provided. Additional aspects and advantages of the invention will be set forth in part in the following description, or may be apparent from the description, or may be learned through practice of the invention.

In a first exemplary embodiment, a dishwasher appliance is provided. The dishwasher appliance includes a tub that defines a wash chamber. The tub defines a filter medium such that the filter medium is integrally formed within the tub. The tub also defines a supply conduit within the tub. A pump is mounted to the tub. A spray assembly is disposed within the wash chamber of the tub. The supply conduit of the tub extends from the filter medium to the spray assembly such that the supply conduit of the tub directs filtered water from the filter medium to the spray assembly during operation of the pump.

In a second exemplary embodiment, a method for forming a unitary tub for a dishwasher appliance is provided. The method includes establishing three-dimensional information of the unitary tub, converting the three-dimensional information of the unitary tub from the step of establishing into a plurality of slices with each slice of the plurality of slices defining a respective cross-sectional layer of the unitary tub, and successively forming each cross-sectional layer of the unitary tub with an additive process. After the step of successively forming, the unitary tub: (1) defines a filter medium within at least one wall of the unitary tub; and (2) defines a supply conduit within at least one wall of the unitary tub with the supply conduit of the unitary tub positioned such that the supply conduit of the unitary tub is configured for directing filtered water away from the filter medium.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front elevation view of a dishwasher appliance according to an exemplary embodiment of the present subject matter.

FIG. 2 provides a partial side section view of the exemplary dishwasher appliance of FIG. 1.

FIG. 3 provides a perspective view of a tub of the exemplary dishwasher appliance of FIG. 1.

FIG. 4 provides a section view of the tub of the exemplary dishwasher appliance of FIG. 1 taken along the 4-4 line of FIG. 3.

FIG. 5 illustrates a method for forming a unitary tub for a dishwasher appliance according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 depict a dishwasher appliance 100 according to an exemplary embodiment of the present subject matter. Dishwasher appliance 100 defines a vertical direction V, a lateral direction L (FIG. 1) and a transverse direction T (FIG. 2). The vertical, lateral, and transverse directions V, L, and T are mutually perpendicular and form an orthogonal direction system.

Dishwasher appliance 100 includes a chassis or cabinet 102 having a tub 200. Tub 200 defines a wash chamber 106 and includes a front opening (not shown) and a door 120 hinged at its bottom 122 for movement between a normally closed vertical position (shown in FIGS. 1 and 2), wherein wash chamber 106 is sealed shut for washing operation, and a horizontal open position for loading and unloading of articles from dishwasher appliance 100. A latch 114 is used to lock and unlock door 120 for access to chamber 106.

Slide assemblies 124 are mounted on opposing tub sidewalls 128 to support and provide for movement of an upper rack assembly 130. Lower guides 126 are positioned in opposing manner of the sides of chamber 106 and provide a ridge or shelf for roller assemblies 136 so as to support and provide for movement of a lower rack assembly 132. Each of the upper and lower rack assemblies 130 and 132 is fabricated into lattice structures including a plurality of elongated members 134 and 135 that extend in lateral (L), transverse (T), and/or vertical (V) directions. Each rack assembly 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by slide assemblies 124 and roller assemblies 136 that carry the upper and lower rack assemblies 130 and 132, respectively. A silverware basket 150 may be removably attached to the lower rack assembly 132 for placement of silverware, small utensils, and the like, that are too small to be accommodated by the upper and lower rack assemblies 130, 132.

Dishwasher appliance 100 also includes a lower spray assembly 144 that is rotatably mounted within a lower region 146 of the wash chamber 106 and above a tub sump portion 142 so as to rotate in relatively close proximity to lower rack assembly 132. A spray arm or mid-level spray assembly 148 is located in an upper region of the wash chamber 106 and may be located in close proximity to upper rack assembly 130. Additionally, an upper spray assembly (not shown) may be located above the upper rack assembly 130 and mounted to an upper wall of tub 200.

Lower and mid-level spray assemblies 144, 148 and the upper spray assembly are fed by a fluid circulation assembly for circulating water and wash fluid in the tub 200. Portions of the fluid circulation assembly may be located in a machinery compartment 140 located below tub sump portion 142 of tub 200, as generally recognized in the art. Each spray assembly includes an arrangement of discharge ports or orifices for directing washing liquid onto dishes or other articles located in upper and lower rack assemblies 130, 132, respectively. The arrangement of the discharge ports in at least the lower spray assembly 144 provides a rotational force by virtue of washing fluid flowing through the discharge ports. The resultant rotation of lower spray assembly 144 provides coverage of dishes and other articles with a washing spray.

Dishwasher appliance 100 is further equipped with a controller 116 to regulate operation of dishwasher appliance 100. Controller 116 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 116 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 116 may be positioned in a variety of locations throughout dishwasher appliance 100. In the illustrated embodiment, controller 116 may be located within a control panel area 110 of door 120 as shown. In such an embodiment, input/output ("I/O") signals may be routed between the control system and various operational components of dishwasher appliance 100 along wiring harnesses that may be routed through bottom 122 of door 120. Typically, the controller 116 includes a user interface panel 112 through which a user may select various operational features and modes and monitor progress of the dishwasher appliance 100. In one embodiment, user interface panel 112 may represent a general purpose I/O ("GPIO") device or functional block. In one embodiment, the user interface panel 112 may include input components, such as one or more of a variety of electrical, mechanical or electro-mechanical input devices including rotary dials, push buttons, and touch pads. User interface panel 112 may include a display component, such as a digital or analog display device designed to provide operational feedback to a user. User interface panel 112 may be in communication with controller 116 via one or more signal lines or shared communication busses.

It should be appreciated that the present subject matter is not limited to any particular style, model, or configuration of dishwasher appliance. Thus, the exemplary embodiment depicted in FIGS. 1 and 2 is provided for illustrative purposes only. For example, different locations may be provided for a user interface 112, different configurations may be provided for upper and lower rack assemblies 130, 132 and/or lower and mid-level spray assemblies 144, 148, and other differences may be applied as well.

FIG. 3 provides a perspective view of tub 200 of dishwasher appliance 100. FIG. 4 provides a section view of tub 200 taken along the 4-4 line of FIG. 3. As may be seen in FIGS. 3 and 4, tub 200 includes a bottom wall 202, a back wall 204 and a top wall 206. Tub 200 also extend between a top portion 208 and a bottom portion 209, e.g., along the vertical direction V. Bottom wall 202 of tub 200 is positioned at or adjacent bottom portion 209 of tub 200, and top wall 206 is positioned at or adjacent top portion 208 of tub 200. Thus, bottom wall 202 and top wall 206 of tub 200 are spaced apart from each other, e.g., along the vertical direction V. Back wall 204 (e.g., and tub side walls 128) extends between and connects bottom and top walls 202, 206 of tub 200, e.g., along the vertical direction V. As discussed in greater detail below, tub 200 may be a unitary tub such tub 200 is integrally formed of a continuous material, such as a plastic. Thus, bottom wall 202, back wall 204, top wall 206 and tub side walls 128 may be integrally formed of a continuous material, e.g., such as a single, continuous piece of plastic.

As may be seen in FIGS. 2, 3 and 4, the fluid circulation assembly of dishwasher appliance 100 includes a filter medium 210 and a pump 220 with a motor 222 and an impeller 224. Pump 220 may be positioned at or adjacent bottom portion 209 of tub 200, and a spray assembly 230, such as lower spray assembly 144 and/or mid-level spray assembly 148, may be positioned above pump 220 along the vertical direction V. Impeller 224 of pump 220 is disposed within a wall of tub 200 and is coupled to motor 222. Thus, motor 222 rotates or spins impeller 224 within tub 200 during operation of motor 222. When impeller 224 rotates within tub 200, impeller 224 draws wash fluid from wash chamber 106 into tub 200 and urges such wash fluid through filter medium 210 to spray assembly 230. Filter medium 210 and pump 220 are discussed in greater detail below.

As may be seen in FIGS. 3 and 4, filter medium 210 is integrally formed within tub 200. Thus, the material of tub 200 may form filter medium 210 within tub 200. In particular, tub 200 has an inner surface 232 and an outer surface 234, e.g., that are spaced apart from each other. Inner surface 232 of tub 200 is positioned adjacent and faces wash chamber 106 of tub 200, and outer surface 234 of tub 200 is positioned opposite top surface 232 of tub 200, e.g., and faces cabinet 102 and/or machinery compartment 140. Motor 222 of pump 220 may be mounted to tub 200 at bottom wall 202 of tub 200 on outer surface 234 of tub 200. Tub 200 may be integrally formed of a continuous piece of material such that inner surface 232 of tub 200 and outer surface 234 of tub 200 are integrally formed of the continuous piece of material and filter medium 210 is formed within the continuous piece of material, as shown in FIGS. 2, 3 and 4, between the inner and outer surfaces 232, 234 of tub 200.

Filter medium 210 is configured for filtering wash fluid flowing through tub 200 to a spray assembly 230 (FIG. 3), such as lower and mid-level spray assemblies 144, 148. By positioning and/or forming filter medium 210 within tub 200, valuable space within wash chamber 106 of tub 200 and/or machinery compartment 140 may be conserved. In addition, positioning and/or forming filter medium 210 within tub 200 may permit a surface area of filter medium 210 to be relatively large, e.g., compared to dishwasher appliances with separate filter cartridges mounted within tub sump portion 142. For example, the surface area of filter medium 210 within tub 200 may be at least two square feet, three square feet, five square feet, etc.

Filter medium 210 may be positioned within any suitable portion of tub 200. For example, portions of filter medium 210 may be positioned within any suitable combination (e.g., at least two) of bottom wall 202, back wall 204 and top wall 206 of tub 200. Thus, filter medium 210 may be extend between top and bottom portions 208, 209 of tub 200 along the vertical direction V within bottom wall 202, back wall 204 and top wall 206 of tub 200, as shown in FIGS. 3 and 4.

Tub 200 also defines an unfiltered volume or compartment 214 and a filtered volume or compartment 216 within tub 200, e.g., within at least one of bottom wall 202, back wall 204, top wall 206 of tub 200. Unfiltered compartment 214 is contiguous with wash chamber 106 of tub 200 and is configured for receiving wash fluid from wash chamber 106 during operation of pump 220. Thus, pump 220 draws wash fluid from wash chamber 106 into unfiltered compartment 214 during operation of pump 220. Impeller 224 of pump 220 may be positioned or disposed within unfiltered compartment 214. Filtered compartment 216 is positioned opposite unfiltered compartment 214 about filter medium 210 within tub 200. Pump 220 urges wash fluid within unfiltered compartment 214 through filter medium 210 to filtered compartment 216 during operation of pump 220. Filter medium 210 may remove particles and other debris from wash fluid passing through filter medium 210 during operation of pump 220. Spray assembly 230 within wash chamber 106 of tub 200 is positioned for receiving wash fluid from filtered compartment 216 during operation of pump 220. Thus, filtered wash fluid may be directed to spray assembly 230 via a supply conduit 218 defined within tub 200. Supply conduit 218 of tub 200 extends from filter medium 210 to spray assembly 230 such that supply conduit 218 of tub 200 directs filtered water from filter medium 210 to spray assembly 230 during operation of pump 220. Filtered compartment 216 may form at least a portion of supply conduit 218.

Filter medium 210 defines a plurality of pores 212, e.g., that extend between unfiltered and filtered compartments 214, 216 of tub 200. Thus, wash fluid may pass through filter medium 210 from unfiltered compartment 214 to filtered compartment 216 via pores 212. Pores 212 may have any suitable size, combination of sizes or distribution of sizes. As an example, the size of pores 212 may change between top and bottom portions 208, 209 of tub 200. In particular, pores of pores 212 that are positioned at adjacent bottom portion 209 of tub 200 may be larger than pores of pores 212 positioned at or adjacent top portion 208 of tub 200, in certain exemplary embodiments. Thus, the portion of filter medium 210 at or adjacent bottom portion 209 of tub 200 may function as a relatively coarse filter, and the portion of filter medium 210 at or adjacent top portion 208 of tub 200 may function as a relatively fine filter. The pores of pores 212 positioned adjacent top portion 208 of tub 200 may have a size (e.g., an opening width or diameter) of less than two hundredths of an inch, and filter medium 210 may have an open area of at least thirty-five percent at top portion 208 of tub 200. As used herein, the term "filtration open area" corresponds to the sum of all the areas of pores 212 in filter medium 210 through which fluid can pass and is expressed as a percentage of the effective filtration area. The effective filtration area of filter medium 210 corresponds to the total area of filter medium 210 that is exposed to fluid flow and is usable for a filtration process. Such sizing of pores 212 may assist with increasing a filtering capacity of filter medium 210, as will be understood by those skilled in the art.

As discussed above, filter medium 210 can be can be configured for both coarse filtration (e.g. filtering of relatively large particles) and fine filtration (e.g. filtering of relatively small particles). Accordingly, in one exemplary aspect of the present subject matter, a portion of filter medium 210 may be configured (e.g., define holes or apertures) for removing particles in the size range of about fifty microns to about four hundred microns. In another exemplary aspect of the present subject matter, a portion of filter medium 210 may be configured (e.g., define holes or apertures) for removing particles in the size range of about three hundred microns to about six hundred microns. These size ranges are provided by way of example only. Other ranges may be used in certain exemplary embodiments of the present subject matter as well.

It should be understood that, in alternative exemplary embodiments, the portion of filter medium 210 at or adjacent bottom portion 209 of tub 200 may function as a relatively fine filter, and the portion of filter medium 210 at or adjacent top portion 208 of tub 200 may function as a relatively coarse filter. Accordingly, pores of pores 212 that are positioned at adjacent top portion 208 of tub 200 may be larger than pores of pores 212 positioned at or adjacent bottom portion 209 of tub 200.

As shown in FIG. 3, filter medium 210 may also be rippled or convoluted. Thus, outer surfaces of filter medium 210 may be non-planar in certain exemplary embodiments. When filter medium 210 is rippled or convoluted, the filtering capacity of filter medium 210 may be increased relative to when outer surfaces of filter medium 210 is flat or planar, e.g., due to the increased surface area of rippled surfaces relative to flat surfaces. However, it should be understood that outer surfaces of filter medium 210 may be flat or planar, in certain exemplary embodiments.

Tub 200 may also define a soil collection chamber 236 within tub 200, e.g., within one of tub side walls 128 at or adjacent bottom portion 209 of tub 200. Soil collection chamber 236 is positioned or disposed downstream of spray assembly 230 and is contiguous with unfiltered compartment 214. Debris and soil within unfiltered compartment 214 may flow into and collect within soil collection chamber 236 during operation of pump 220. After completion of a wash cycle, soil collection chamber 236 may be drained, e.g., with a drain pump (not shown) within machinery compartment, in order to remove the accumulated debris and soil.

FIG. 5 illustrates a method 500 for forming a unitary tub for a dishwasher appliance according to an exemplary embodiment of the present subject matter. Method 500 may be used to form any suitable tub. For example, method 500 may be used to form tub 200 (FIG. 2). Method 500 permits formation of various features of tub 200, as discussed in greater detail below. Method 500 includes fabricating tub 200 as a unitary tub, e.g., such that tub 200 is formed of a continuous piece of plastic, metal or other suitable material. More particularly, method 500 includes manufacturing or forming tub 200 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 510, three-dimensional information of tub 200 is determined. As an example, a model or prototype of tub 200 may be scanned to determine the three-dimensional information of tub 200 at step 510. As another example, a model of tub 200 may be constructed using a suitable CAD program to determine the three-dimensional information of tub 200 at step 510. At step 520, the three-dimensional information is converted into a plurality of slices that each defines a cross-sectional layer of tub 200. As an example, the three-dimensional information from step 510 may be divided into equal sections or segments, e.g., along a central axis of tub 200 or any other suitable axis. Thus, the three-dimensional information from step 510 may be discretized at step 520, e.g., in order to provide planar cross-sectional layers of tub 200.

After step 520, tub 200 is fabricated using the additive process, or more specifically each layer is successively formed at step 530, e.g., by fusing or polymerizing a plastic using laser energy or heat. The layers may have any suitable size. For example, each layer may have a size between about five ten-thousandths of an inch and about one thousandths of an inch. Tub 200 may be fabricated using any suitable additive manufacturing machine as step 530. For example, any suitable laser sintering machine, inkjet printer or laserjet printer may be used at step 530.

Utilizing method 500, tub 200 may have fewer components and/or joints than known tubs. Specifically, tub 200 may require fewer components because tub 200 may be a single piece of continuous plastic or metal, e.g., rather than multiple pieces of plastic or metal joined or connected together. Also, method 500 may form tub 200 such filter medium 210 is integrally formed within tub 200, e.g., with suitably sized pores 212. Also, tub 200 may be less prone to leaks and/or be stronger when formed with method 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A dishwasher appliance, comprising:
a tub that defines a wash chamber, the tub defining a filter medium such that the filter medium is integrally formed within the tub, the tub also defining a supply conduit within the tub, the tub defining an unfiltered compartment and a filtered compartment within the tub, the filter medium positioned between the unfiltered and filtered compartments within the tub, the filter medium defining a plurality of pores between the unfiltered and filtered compartments of the tub, the tub extending between a top portion and a bottom portion, the filter medium extending between the top portion of the tub and the bottom portion of the tub within the tub, the pores of the plurality of pores positioned adjacent the bottom portion of the tub being larger than pores of the plurality of pores positioned adjacent the top portion of the tub;

a pump mounted to the tub;

a spray assembly disposed within the wash chamber of the tub, the supply conduit of the tub extending from the filter medium to the spray assembly such that the supply conduit of the tub directs filtered water from the filter medium to the spray assembly during operation of the pump.

2. The dishwasher appliance of claim 1, wherein the pores of the plurality of pores positioned adjacent the top portion of the tub have a size of less than two hundredths of an inch, the filter medium having an open area of at least thirty-five percent at the top portion of the tub.

3. The dishwasher appliance of claim 1, wherein the pump is positioned at the bottom portion of the tub, the spray assembly positioned at the top portion of the tub.

4. The dishwasher appliance of claim 1, wherein the tub is integrally formed of a continuous material.

5. The dishwasher appliance of claim 1, wherein the tub defines an inner surface that faces the wash chamber of the tub and an outer surface positioned opposite the inner surface of the tub, the filter medium positioned between the inner and outer surfaces of the tub.

6. The dishwasher appliance of claim 1, wherein the filter medium is rippled or convoluted.

\* \* \* \* \*